(12) United States Patent
Yuan

(10) Patent No.: US 11,675,433 B2
(45) Date of Patent: Jun. 13, 2023

(54) DYNAMIC IR EMISSION CONTROL FOR FAST RECOGNITION OF EYE TRACKING SYSTEM

(71) Applicant: Panasonic Automotive Systems Company of America, Division of Panasonic Corporation of North America, Peachtree City, GA (US)

(72) Inventor: Liang Yuan, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 17/682,879

(22) Filed: Feb. 28, 2022

(65) Prior Publication Data

US 2022/0283635 A1 Sep. 8, 2022

Related U.S. Application Data

(60) Provisional application No. 63/158,308, filed on Mar. 8, 2021.

(51) Int. Cl.
*G09G 5/00* (2006.01)
*G06F 3/01* (2006.01)
*H04N 5/33* (2023.01)
*G02B 27/01* (2006.01)
*B60K 35/00* (2006.01)

(52) U.S. Cl.
CPC ......... *G06F 3/013* (2013.01); *G02B 27/0101* (2013.01); *G02B 27/0179* (2013.01); *H04N 5/33* (2013.01); *B60K 35/00* (2013.01); *B60K 2370/1529* (2019.05); *B60K 2370/21* (2019.05); *B60K 2370/23* (2019.05); *B60K 2370/736* (2019.05); *G02B 2027/014* (2013.01); *G02B 2027/0138* (2013.01); *G02B 2027/0187* (2013.01)

(58) Field of Classification Search
CPC . G06F 3/013; G02B 27/0101; G02B 27/0179; H04N 5/33
USPC .......................................................... 345/156
See application file for complete search history.

(56) References Cited

U.S. PATENT DOCUMENTS

2010/0066984 A1* 3/2010 Horiuchi ............ G02B 27/0101
353/97
2015/0009334 A1* 1/2015 Kwon ..................... G06F 3/013
348/333.01

(Continued)

*Primary Examiner* — Jonathan M Blancha
(74) *Attorney, Agent, or Firm* — Laurence S. Roach, Esq.

(57) ABSTRACT

A picture generation unit emits a light field. A mirror reflects the light field toward a windshield of a motor vehicle such that the light field is reflected off of the windshield and is visible to the driver as a virtual image. An infrared emitter transmits infrared energy through the mirror such that the infrared energy is substantially co-axial with the light field, and such that the infrared energy is reflected off of the windshield toward the human driver. An infrared camera captures infrared images based on the transmitted infrared energy reflected off of the human driver and received by the infrared camera. Eye tracking is performed based on the captured infrared images. The infrared energy is transmitted at a higher power level at a beginning of the eye tracking than after the beginning of the eye tracking.

19 Claims, 3 Drawing Sheets

(56) References Cited

U.S. PATENT DOCUMENTS

| | | | |
|---|---|---|---|
| 2015/0186722 A1* | 7/2015 | Cho .................. | G06V 40/19 348/78 |
| 2016/0150218 A1* | 5/2016 | Yoon ................ | G02B 27/0101 348/77 |
| 2020/0166750 A1* | 5/2020 | Yasui ................ | G02B 26/0858 |

* cited by examiner

DYNAMIC IR EMISSION CONTROL FOR FAST RECOGNITION OF EYE TRACKING SYSTEM

CROSS-REFERENCED TO RELATED APPLICATIONS

This application claims benefit of U.S. Provisional Application No. 63/158,308, filed on Mar. 8, 2021, the disclosure of which is hereby incorporated by reference in its entirety for all purposes.

BACKGROUND OF THE INVENTION

1. Field of the Invention

The present invention relates to an eye tracking system, and, more particularly, to an eye tracking system in a motor vehicle.

2. Description of the Related Art

A head up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

There are many eye tracking systems used in motor vehicles, but none of them are packaged in a HUD.

SUMMARY OF THE INVENTION

The invention may include an eye tracking system (ETS) embedded in a head up display (HUD). Using infrared (IR) wavelengths in an eye tracking system (ETS) has the advantage of the ETS hardware being invisible to the driver (e.g., hidden in the head up display (HUD)). Another advantage is that the ETS module faces the driver from a substantially straight angle via reflection from the windshield, wherein visible image optical pathways are used for more than one purpose, such as HUD and eye tracking. An IR-based ETS needs good illumination of the driver's face and takes time to have the face recognized and the eye position tracked. The initial pick-up of an eye position is not instantaneous and takes many seconds or even longer.

The illumination level is important to the operation of an ETS. Use of IR wavelengths with an IR illuminator enables an ETS to work in both daytime and nighttime. The IR illumination strength level may affect whether or not a face can be tracked (e.g., the illumination level may be too low for face tracking to be performed) and how quick the face gets tracked. In particular, if the illumination level is too low and thus the driver's face looks very dark, then there is a greater chance that the eyes cannot be tracked.

The invention comprises, in one form thereof, a head up display and eye tracking arrangement for a motor vehicle, including a picture generation unit emitting a light field. A mirror is positioned to reflect the light field toward a windshield of the motor vehicle such that the light field is reflected off of the windshield toward a human driver of the motor vehicle and is visible to the driver as a virtual image. An infrared emitter transmits infrared energy through the mirror such that the transmitted infrared energy is substantially co-axial with the light field after the light field has been reflected by the mirror, and such that the infrared energy is reflected off of the windshield toward the human driver. An infrared camera captures infrared images based on the transmitted infrared energy reflected off of the human driver, reflected a second time off of the windshield, and received by the infrared camera. An electronic processor performs eye tracking based on the captured infrared images, and causes the infrared energy to be transmitted at an initial power level at a beginning of the eye tracking and at a later power level after the beginning of the eye tracking. The initial power level is greater than the later power level.

The invention comprises, in another form thereof, a display and eye tracking method for a motor vehicle, including emitting a light field. A mirror is positioned to reflect the light field toward a windshield of the motor vehicle such that the light field is reflected off of the windshield toward a human driver of the motor vehicle and is visible to the driver as a virtual image. Infrared energy is transmitted through the mirror such that the transmitted infrared energy is substantially co-axial with the light field after the light field has been reflected by the mirror, and such that the infrared energy is reflected off of the windshield toward the human driver. The transmitted infrared energy is received after the transmitted infrared energy has been reflected off of the human driver and reflected a second time off of the windshield. Eye tracking is performed based on the received infrared energy. The infrared energy is transmitted at an initial power level during a beginning stage of the eye tracking and at a later power level immediately after the beginning stage of the eye tracking. The initial power level is greater than the later power level.

The invention comprises, in yet another form thereof, a head up display and eye tracking arrangement for a motor vehicle, including a picture generation unit emitting a light field. A mirror is positioned to reflect the light field toward a windshield of the motor vehicle such that the light field is reflected off of the windshield toward a human driver of the motor vehicle and is visible to the driver as a virtual image. At least one infrared emitter is positioned to emit infrared energy through the mirror such that the emitted infrared energy is substantially co-axial with the light field after the light field has been reflected by the mirror, and such that the infrared energy is reflected off of the windshield toward the human driver. An infrared camera is positioned to capture infrared images based on the emitted infrared energy reflected off of the human driver, reflected a second time off of the windshield, and received by the infrared camera. An electronic processor is communicatively coupled to the at least one infrared emitter and to the infrared camera. The electronic processor performs eye tracking based on the captured infrared images. The infrared energy is caused to be emitted at an initial brightness level during a beginning stage of the eye tracking and at a later brightness level immediately after the beginning stage of the eye tracking. The initial brightness level is greater than the later brightness level.

An advantage of the invention is that it uses dynamic control of ETS IR emission to improve ETS pick-up and tracking performance.

Another advantage of the invention is that it enables the driver's face, which is an area that needs to be seen by the eye-tracking camera, to be illuminated more brightly at the beginning of eye tracking to hasten the first pick up or recognition of the eyes that are to be tracked.

Yet another advantage of the invention is that it solves in part the problem that the driver's face may appear dark (or not sufficiently bright) in some existing ETS.

A further advantage of the invention is that it provides enhanced performance of an ETS without changing the illuminator component or causing significant thermal effects.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
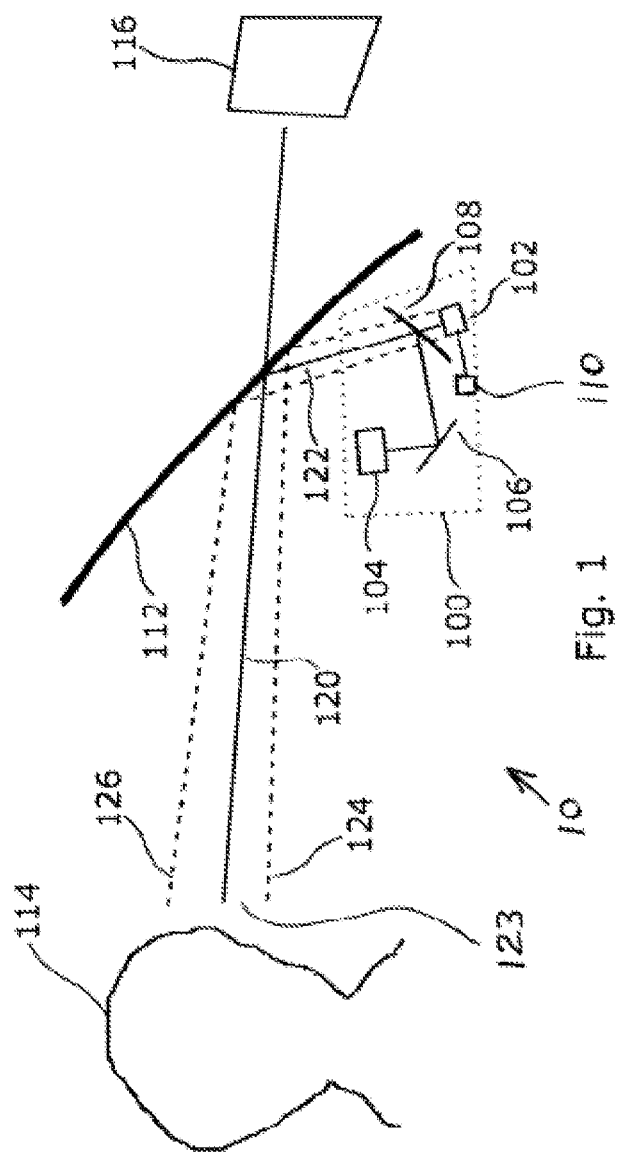
FIG. 1 is a schematic diagram of one embodiment of a head up display and eye tracking arrangement of the present invention.

FIG. 1 illustrates one embodiment of a head up display (HUD) and eye tracking arrangement 10 of the present invention, including an eye tracking system (ETS) HUD (windshield type) 100 having an IR part (e.g., an IR energy transmitter/receiver and camera) 102, a picture generation unit (PGU) 104, a fold mirror 106, a freeform (cold) mirror 108, and an electronic processor or controller 110 that controls the power with which IR energy is transmitted by IR part 102 as a function of time. Processor 110 may also analyze the images captured by the IR camera in IR part 102 to detect the position of the head or eyes of a human driver 114 in the images. Head up display (HUD) and eye tracking arrangement 10 further includes windshield 112.

FIG. 1 shows a schematic of a traditional ETS HUD (windshield type) 100, with the ETS camera of IR part 102 on the optical axis and multiple IR illuminators of IR part 102 disposed around the camera. The emission from different IR illuminators on the same IR part 102, especially the axial ray, joins the visible axial light ray from picture generation unit (PGU) 104 and fold mirror 106 at the freeform (cold) mirror 108. The visible light is reflected by different areas on mirror 108 and, along with the IR energy that transmits through mirror 108, is subsequently reflected by windshield 112 toward human driver 114. The visible light and IR energy eventually reach the driver 114, and thus the driver can see a virtual image 116 that appears to be outside of windshield 112 ahead of the vehicle. The axial rays 120, 122 that start from the center of eye box 123 reach the center of the IR camera of IR part 102. The rays 124 and 126 represent some edge rays or outermost rays from the driver's face that can be seen by the IR camera of IR part 102.

When the environment is dark (e.g., during a storm or at nighttime), has artificial lighting but the IR spectrum is insufficient (e.g., indoors or in a tunnel), or in any other cases where more IR illumination would be beneficial, an increase of IR illumination from the ETS may be desirable to supply a greater illumination brightness level on the driver's face. Such an increase in the illumination brightness level on the driver's face can be achieved by providing a greater number of IR illuminators or by driving the existing IR illuminators at a higher power level. The present invention may use dynamic IR emission control that delivers a stronger-than-normal light level during the initial pick-up stage of ETS and then adjusts to a normal light level afterwards to maintain good tracking. In a pulsed or emission scheme, the average illumination brightness level may be increased by having a longer pulse time duration or width.

Figure 2:
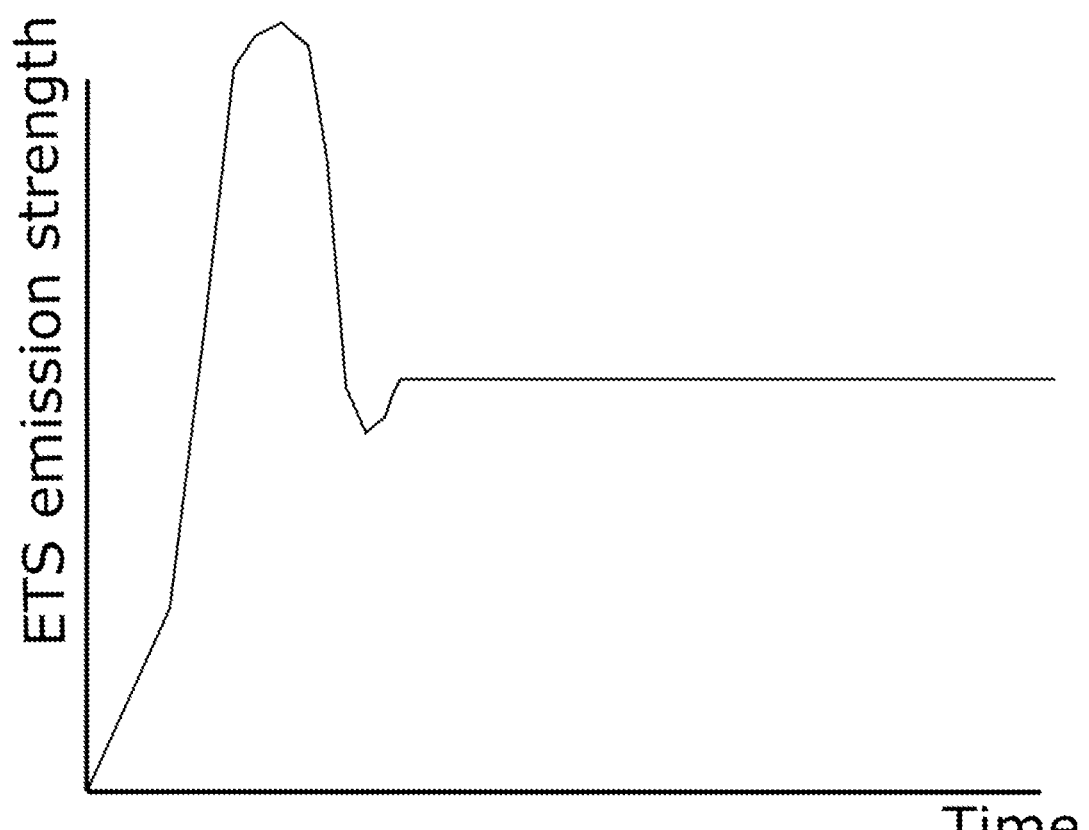
FIG. 2 is a plot of infrared emission strength versus time in one embodiment of an eye tracking system of the present invention.

In one embodiment, for both continuous wave (cw) and a pulsed emission scheme, overshooting the IR emission as soon as the ETS is switched or flashed on may provide a higher-than-normal illumination brightness level at the beginning. FIG. 2 illustrates one example of such dynamic IR emission control. The IR emission strength or brightness level overshoots and is higher immediately after the ETS is turned on, and then stabilizes at the normal steady-state brightness level.

In another embodiment for a pulsed emission scheme, the duty cycle of the LEDs is set to a higher-than-normal level as soon as the ETS is switched or flashed on. For example, during the first few seconds after the ETS is switched on, the LEDs may be provided with higher and dynamic duty cycle control until the first face pick-up in the ETS.

In yet another embodiment, the driving current and/or the voltage of the LEDs is automatically set higher (via an electric circuit designed to enable) to achieve more emission power at the beginning of eye tracking.

In a further embodiment, both duty cycle and emission power are set higher at the beginning of eye tracking.

In still another embodiment, a strong spike modeled as a delta pulse or unit impulse (having a time duration approximately between one microsecond and one second) of emission is enabled at the beginning of eye tracking. This ultra-short and ultra-strong emission pulse may help to quickly catch the first face pick-up.

In a still further embodiment, a dynamic beam shaping lens with beam-angle tenability may be used to achieve a higher brightness level of the face by adjusting to a narrow beam angle at the beginning of eye tracking to concentrate more light on the face.

There could be a situation where the environmental lighting (e.g. sunlight) is already too strong, and additional IR emission would not enable any better performance. In such cases, IR illuminators may not be turned on until the environmental lighting becomes weaker.

Figure 3:
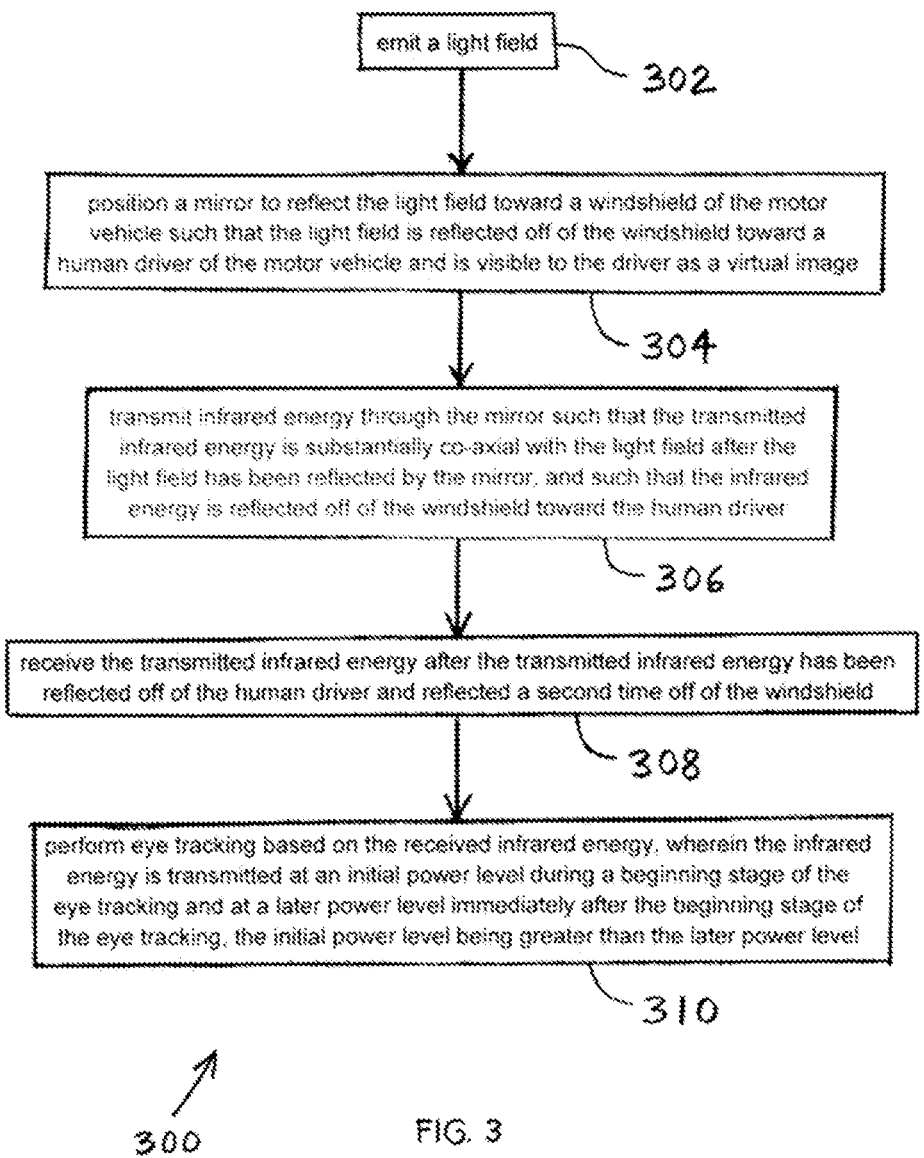
FIG. 3 is a flow chart of one embodiment of a display and eye tracking method of the present invention for a motor vehicle.

FIG. 3 is a flow chart of one embodiment of a display and eye tracking method 300 of the present invention for a motor vehicle. In a first step 302, a light field is emitted. For example, picture generation unit (PGU) 104 may emit a light field.

Next, in step 304, a mirror is positioned to reflect the light field toward a windshield of the motor vehicle such that the light field is reflected off of the windshield toward a human driver of the motor vehicle and is visible to the driver as a virtual image. For example, mirror 108 is positioned to reflect the light field toward a windshield 112 of the motor vehicle such that the light field is reflected off of windshield 112 toward a human driver 114 of the motor vehicle and is visible to driver 114 as a virtual image 116.

In a next step 306, infrared energy is transmitted through the mirror such that the transmitted infrared energy is substantially co-axial with the light field after the light field has been reflected by the mirror, and such that the infrared energy is reflected off of the windshield toward the human driver. For example, infrared energy from an IR energy transmitter of IR part 102 is transmitted through mirror 108 such that the transmitted infrared energy is substantially co-axial with the light field after the light field has been reflected by mirror 108, and such that the infrared energy is reflected off of windshield 112 toward human driver 114.

In step 308, the transmitted infrared energy is received after the transmitted infrared energy has been reflected off of the human driver and reflected a second time off of the windshield. For example, the transmitted infrared energy is received by the IR energy receiver of IR part 102 after the transmitted infrared energy has been reflected off of human driver 114 and reflected a second time off of windshield 112.

In a final step 310, eye tracking is performed based on the received infrared energy, wherein the infrared energy is transmitted at an initial power level during a beginning stage of the eye tracking and at a later power level immediately after the beginning stage of the eye tracking. The initial power level is greater than the later power level. For example, eye tracking is performed by electronic processor or controller 110 based on the received infrared energy, wherein the infrared energy is transmitted at a relatively high initial power level during a beginning stage of the eye tracking and at a relatively low later power level immediately after the beginning stage of the eye tracking, as shown in FIG. 2.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A head up display and eye tracking arrangement for a motor vehicle, the arrangement comprising:
    a picture generation unit configured to emit a light field;
    a mirror positioned to reflect the light field toward a windshield of the motor vehicle such that the light field is reflected off of the windshield toward a human driver of the motor vehicle and is visible to the driver as a virtual image;
    a first infrared emitter and a second infrared emitter both positioned to transmit infrared energy through the mirror such that the transmitted infrared energy is substantially co-axial with the light field after the light field has been reflected by the mirror, and such that the infrared energy is reflected off of the windshield toward the human driver;
    an infrared camera positioned to capture infrared images based on the transmitted infrared energy reflected off of the human driver, reflected a second time off of the windshield, and received by the infrared camera; and
    an electronic processor communicatively coupled to the at least one infrared emitter and to the infrared camera, the electronic processor being configured to:
        perform eye tracking based on the captured infrared images;
        cause the infrared energy to be transmitted at an initial power level during a beginning stage of the eye tracking and at a later power level immediately after the beginning stage of the eye tracking, the initial power level being greater than the later power level; and
        cause the second infrared emitter to be on during the beginning stage of the eye tracking and off immediately after the beginning stage of the eye tracking, and remain off for a time duration greater than a time duration of the beginning stage of the eye tracking.

2. A head up display and eye tracking arrangement for a motor vehicle, the arrangement comprising:
    a picture generation unit configured to emit a light field;
    a mirror positioned to reflect the light field toward a windshield of the motor vehicle such that the light field is reflected off of the windshield toward a human driver of the motor vehicle and is visible to the driver as a virtual image;
    at least one infrared emitter positioned to transmit infrared energy through the mirror such that the transmitted infrared energy is substantially co-axial with the light field after the light field has been reflected by the mirror, and such that the infrared energy is reflected off of the windshield toward the human driver;
    an infrared camera positioned to capture infrared images based on the transmitted infrared energy reflected off of the human driver, reflected a second time off of the windshield, and received by the infrared camera; and
    an electronic processor communicatively coupled to the at least one infrared emitter and to the infrared camera, the electronic processor being configured to:
        perform eye tracking based on the captured infrared images; and
        cause the infrared energy to be transmitted at an initial power level during a beginning stage of the eye tracking and at a later power level immediately after the beginning stage of the eye tracking, the initial power level being greater than the later power level, the infrared energy being transmitted at the later power level for a time duration greater than a time duration of the beginning stage of the eye tracking.

3. The arrangement of claim 2 wherein the mirror comprises a freeform mirror, the arrangement further comprising a fold mirror, the fold mirror being positioned to reflect the light field toward the freeform mirror.

4. The arrangement of claim 2 wherein the initial power level is at least 80 percent greater than the later power level.

5. The arrangement of claim 2 wherein the later power level comprises a steady-state power level.

6. The arrangement of claim 2 wherein the electronic processor is configured to cause the infrared energy to be transmitted at an initial duty cycle during the beginning stage of the eye tracking and at a later duty cycle immediately after the beginning stage of the eye tracking, the initial duty cycle being greater than the later power duty cycle.

7. A display and eye tracking method for a motor vehicle, the method comprising:
    emitting a light field;
    positioning a mirror to reflect the light field toward a windshield of the motor vehicle such that the light field is reflected off of the windshield toward a human driver of the motor vehicle and is visible to the driver as a virtual image;

transmitting infrared energy through the mirror such that the transmitted infrared energy is substantially co-axial with the light field after the light field has been reflected by the mirror, and such that the infrared energy is reflected off of the windshield toward the human driver;
receiving the transmitted infrared energy after the transmitted infrared energy has been reflected off of the human driver and reflected a second time off of the windshield; and
performing eye tracking based on the received infrared energy, wherein the infrared energy is transmitted at an initial power level during a beginning stage of the eye tracking and at a later power level immediately after the beginning stage of the eye tracking, the initial power level being greater than the later power level, wherein the infrared energy is transmitted by both a first infrared emitter and a second infrared emitter during the beginning stage of the eye tracking, and the second infrared emitter is off immediately after the beginning stage of the eye tracking and remains off for a time duration greater than a time duration of the beginning stage of the eye tracking.

8. A display and eye tracking method for a motor vehicle, the method comprising:
emitting a light field;
positioning a mirror to reflect the light field toward a windshield of the motor vehicle such that the light field is reflected off of the windshield toward a human driver of the motor vehicle and is visible to the driver as a virtual image;
transmitting infrared energy through the mirror such that the transmitted infrared energy is substantially co-axial with the light field after the light field has been reflected by the mirror, and such that the infrared energy is reflected off of the windshield toward the human driver;
receiving the transmitted infrared energy after the transmitted infrared energy has been reflected off of the human driver and reflected a second time off of the windshield; and
performing eye tracking based on the received infrared energy, wherein the infrared energy is transmitted at an initial power level during a beginning stage of the eye tracking and at a later power level immediately after the beginning stage of the eye tracking, the initial power level being greater than the later power level, wherein the infrared energy is transmitted at the later power level for a time duration greater than a time duration of the beginning stage of the eye tracking.

9. The method of claim 8 further comprising producing infrared images based on the received infrared energy, wherein the eye tracking is performed based on the infrared images.

10. The method of claim 8 wherein the mirror comprises a freeform mirror, the method further comprising positioning a fold mirror to reflect the light field toward the freeform mirror.

11. The method of claim 8 wherein the initial power level is at least 80 percent greater than the later power level.

12. The method of claim 8 wherein the later power level comprises a steady-state power level.

13. The method of claim 8 wherein the infrared energy is transmitted at an initial duty cycle during the beginning stage of the eye tracking and at a later duty cycle immediately after the beginning stage of the eye tracking, the initial duty cycle being greater than the later power duty cycle.

14. A head up display and eye tracking arrangement for a motor vehicle, the arrangement comprising:
a picture generation unit configured to emit a light field;
a mirror positioned to reflect the light field toward a windshield of the motor vehicle such that the light field is reflected off of the windshield toward a human driver of the motor vehicle and is visible to the driver as a virtual image;
a first infrared emitter and a second infrared emitter both positioned to emit infrared energy through the mirror such that the emitted infrared energy is substantially co-axial with the light field after the light field has been reflected by the mirror, and such that the infrared energy is reflected off of the windshield toward the human driver;
an infrared camera positioned to capture infrared images based on the emitted infrared energy reflected off of the human driver, reflected a second time off of the windshield, and received by the infrared camera; and
an electronic processor communicatively coupled to the at least one infrared emitter and to the infrared camera, the electronic processor being configured to:
perform eye tracking based on the captured infrared images;
cause the infrared energy to be emitted at an initial brightness level during a beginning stage of the eye tracking and at a later brightness level immediately after the beginning stage of the eye tracking, the initial brightness level being greater than the later brightness level; and
cause the second infrared emitter to be on during the beginning stage of the eye tracking and off immediately after the beginning stage of the eye tracking, and remain off for a time duration greater than a time duration of the beginning stage of the eye tracking.

15. A head up display and eye tracking arrangement for a motor vehicle, the arrangement comprising:
a picture generation unit configured to emit a light field;
a mirror positioned to reflect the light field toward a windshield of the motor vehicle such that the light field is reflected off of the windshield toward a human driver of the motor vehicle and is visible to the driver as a virtual image;
at least one infrared emitter positioned to emit infrared energy through the mirror such that the emitted infrared energy is substantially co-axial with the light field after the light field has been reflected by the mirror, and such that the infrared energy is reflected off of the windshield toward the human driver;
an infrared camera positioned to capture infrared images based on the emitted infrared energy reflected off of the human driver, reflected a second time off of the windshield, and received by the infrared camera; and
an electronic processor communicatively coupled to the at least one infrared emitter and to the infrared camera, the electronic processor being configured to:
perform eye tracking based on the captured infrared images; and
cause the infrared energy to be emitted at an initial brightness level during a beginning stage of the eye tracking and at a later brightness level immediately after the beginning stage of the eye tracking, the initial brightness level being greater than the later brightness level; and
cause the infrared energy to be emitted at the later brightness level for a time duration greater than a time duration of the beginning stage of the eye tracking.

16. The arrangement of claim 15 wherein the mirror comprises a freeform mirror, the arrangement further comprising a fold mirror, the fold mirror being positioned to reflect the light field toward the freeform mirror.

17. The arrangement of claim 15 wherein the initial power level is at least 80 percent greater than the later power level.

18. The arrangement of claim 15 wherein the later power level comprises a steady-state power level.

19. The arrangement of claim 15 wherein the electronic processor is configured to cause the infrared energy to be emitted at an initial duty cycle during the beginning stage of the eye tracking and at a later duty cycle immediately after the beginning stage of the eye tracking, the initial duty cycle being greater than the later power duty cycle.

* * * * *